(12) United States Patent
Mertes

(10) Patent No.: US 11,345,480 B2
(45) Date of Patent: May 31, 2022

(54) AIRCRAFT PROPULSIVE ASSEMBLY AND METHOD FOR CHECKING THE INTEGRITY OF AN ENGINE ATTACHMENT OF THE PROPULSIVE ASSEMBLY

(71) Applicant: Airbus Operations SAS, Toulouse (FR)

(72) Inventor: Anthony Mertes, Albi (FR)

(73) Assignee: AIRBUS OPERATIONS SAS, Toulouse (FR)

(*) Notice: Subject to any disclaimer, the term of this patent is extended or adjusted under 35 U.S.C. 154(b) by 448 days.

(21) Appl. No.: 16/419,727

(22) Filed: May 22, 2019

(65) Prior Publication Data

US 2019/0367174 A1 Dec. 5, 2019

(30) Foreign Application Priority Data

Jun. 1, 2018 (FR) ..................... 1854768

(51) Int. Cl.
    *B64D 27/26* (2006.01)
    *F16B 39/24* (2006.01)
    *F16C 11/04* (2006.01)

(52) U.S. Cl.
    CPC ............ *B64D 27/26* (2013.01); *F16B 39/24* (2013.01); *F16C 11/04* (2013.01); *B64D 2027/266* (2013.01); *B64D 2027/268* (2013.01)

(58) Field of Classification Search
    CPC ............ B64D 27/26; B64D 2027/266; B64D 2027/268; F16B 39/24; F16C 11/04
    See application file for complete search history.

(56) References Cited

U.S. PATENT DOCUMENTS

| 5,860,623 A * | 1/1999 | Dunstan ................. B64D 27/26 244/54 |
| 7,165,743 B2 * | 1/2007 | Pasquer ................. B64D 27/26 244/54 |

(Continued)

FOREIGN PATENT DOCUMENTS

| EP | 0872418 A2 | 10/1998 |
| EP | 1481896 A1 | 12/2004 |

(Continued)

OTHER PUBLICATIONS

French Search Report; priority document.

*Primary Examiner* — Richard R. Green
*Assistant Examiner* — Steven J Shur
(74) *Attorney, Agent, or Firm* — Greer, Burns & Crain, Ltd.

(57) ABSTRACT

An aircraft propulsive assembly comprising a pylon and a turbomachine attached to the pylon by an engine attachment system. The attachment system comprises two engine attachments each secured to the pylon and to the turbomachine. Each engine attachment comprises at least one fitting attached to the pylon by a first main link, and attached to the turbomachine by a second main link. Each main link has a clearance-free fit. The fitting being, moreover, secured to either the pylon or the turbomachine by an additional link, referred to as a safety link, which backs up one of the main links. The safety link is in the form of an assembly with a clearance. The assembly of the safety link comprises at least one passage which receives, in a sliding manner, a tool for checking a presence of the clearance.

6 Claims, 7 Drawing Sheets

(56) References Cited

U.S. PATENT DOCUMENTS

| | | | |
|---|---|---|---|
| 7,566,029 B2 * | 7/2009 | Dron | B64D 27/26 |
| | | | 244/54 |
| 9,593,708 B2 * | 3/2017 | Cassagne | F16B 39/24 |
| 2004/0251381 A1 | 12/2004 | Pasquer et al. | |
| 2006/0219841 A1 | 10/2006 | Dron et al. | |
| 2015/0167726 A1 | 6/2015 | Cassagne et al. | |

FOREIGN PATENT DOCUMENTS

| | | |
|---|---|---|
| EP | 1707487 A1 | 10/2006 |
| FR | 3014972 A1 | 6/2015 |

\* cited by examiner

AIRCRAFT PROPULSIVE ASSEMBLY AND METHOD FOR CHECKING THE INTEGRITY OF AN ENGINE ATTACHMENT OF THE PROPULSIVE ASSEMBLY

CROSS-REFERENCES TO RELATED APPLICATIONS

This application claims the benefit of the French patent application No. 1854768 filed on Jun. 1, 2018, the entire disclosures of which are incorporated herein by way of reference.

FIELD OF THE INVENTION

The invention relates to an aircraft propulsive assembly comprising an engine attachment and a method for checking the integrity of the engine attachment.

BACKGROUND OF THE INVENTION

A propulsive assembly comprises a pylon and a turbomachine that is secured to the pylon by an engine attachment system consisting, in particular, of a front engine attachment and a rear engine attachment, respectively arranged at the front and at the rear of the pylon.

As is known, a front or rear engine attachment comprises at least one fitting that is attached, in each case by means of a main link, to the pylon and to the turbomachine. In order to satisfy safety requirements, at least one main link of the engine attachment is backed up by an additional link, referred to as a safety or "fail-safe" link. Each main or safety link is in the form of an assembly consisting of a clevis secured to the pylon or the turbomachine, and a swivel bearing secured to the fitting via an articulation pin that passes through the clevis and engages in the swivel bearing. The main link has a tight (clearance-free) fit, also referred to as engaged mounting, while the safety link has a clearance fit such that the safety link is not operational under nominal operation of the engine attachment. By contrast, the safety link is operational in order to react the loads generated by the turbomachine and transmitted to the pylon in the event of failure of the main link.

Inspection of each engine attachment is planned at frequent intervals by operators when the aircraft is on the ground in order to ensure nominal operation of the engine attachment. During these inspections, operators check that the safety links are not operational. Inspections are laborious as they involve disassembling the parts forming the engine attachment.

SUMMARY OF THE INVENTION

One of the objectives of the invention is to make these inspections easier. To that end, the invention relates to an aircraft propulsive assembly comprising a pylon and a turbomachine attached to the pylon by an engine attachment system comprising two engine attachments, each secured, on one hand, to the pylon and, on the other hand, to the turbomachine, each engine attachment comprising at least one fitting attached to the pylon by a first main link, and attached to the turbomachine by a second main link, each main link having a clearance-free fit, the at least one fitting being moreover secured to either the pylon or the turbomachine by an additional link, referred to as a safety link, the safety link being in the form of an assembly with a clearance such that the safety link is not operational under nominal operation of the engine attachment, the assembly of the safety link comprising at least one passage intended to receive, in operation, a tool for checking the presence of the clearance in order to confirm the non-operation of the safety link.

The absence of a clearance indicates failure of the main link that is backed up by the safety link.

The invention also relates to a method for checking the integrity of an engine attachment of an aircraft propulsive assembly, the propulsive assembly comprising a pylon and a turbomachine attached to the pylon by an engine attachment system comprising two engine attachments each secured, on one hand, to the pylon and, on the other hand, to the turbomachine, each engine attachment comprising at least one fitting attached to the pylon by a first main link, and attached to the turbomachine by a second main link, each main link having a clearance-free fit, the fitting being moreover secured to either the pylon or the turbomachine by an additional link, referred to as a safety link, the safety link being in the form of an assembly with a clearance such that the safety link is not operational under nominal operation of the engine attachment, the assembly of the safety link comprising at least one passage intended to receive, in operation, a tool for checking the presence of the clearance in order to confirm the non-operation of the safety link, wherein the method comprises the following successive steps:

- a step of inserting a checking tool into the passage arranged in an upper portion of the assembly;
- a step of measuring the inserted length of the checking tool;
- a step of comparing the length measured in the measuring step to a predetermined length;
- a step of assessing the integrity of the engine attachment, the engine attachment being assessed as defective if the measured length is less than the predetermined length, or conversely the engine attachment being assessed as intact when the measured length is equal to or greater than the predetermined length.

BRIEF DESCRIPTION OF THE DRAWINGS

The features of the invention mentioned above, along with others, will become more clearly apparent on reading the following description of exemplary embodiments, the description being given with reference to the appended drawings, in which.

DETAILED DESCRIPTION OF THE PREFERRED EMBODIMENTS

Figure 1:
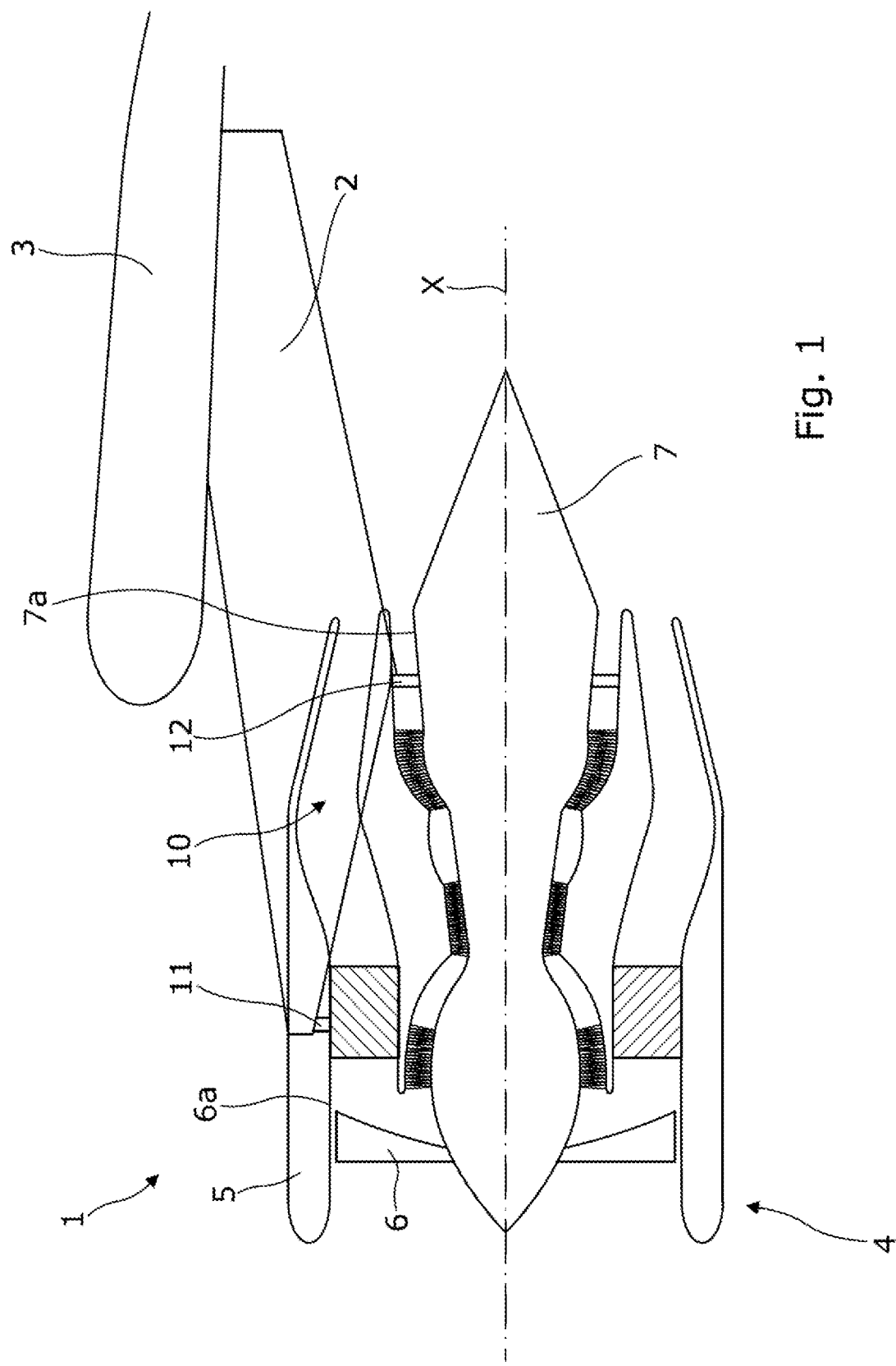
FIG. 1 is a schematic view of an aircraft propulsive assembly according to the invention, the assembly comprising two engine attachments for securing a turbomachine to the pylon.

In relation to FIG. 1, an aircraft propulsive assembly 1 comprises a pylon 2 secured below the wing 3 of an aircraft, and a turbomachine 4. The turbomachine 4 comprises an annular nacelle 5, centered on a longitudinal axis X generally parallel to the ground, that constitutes the outer envelope of the turbomachine and surrounds a fan 6 and an engine 7 that drives the fan 6 in rotation during operation. The turbomachine 4 is secured to the pylon 2 by an engine attachment system 10.

Structural casings are mounted around the elements of the turbomachine 4 and serve to stiffen the latter in order, in particular, to limit distortions during operation. Thus, the fan 6 is enclosed by a fan casing 6a that is secured to the engine, and the elements of the engine 7 are enclosed by an engine casing 7a that is secured to the engine.

The engine attachment system 10 is constituted by, among other things, a front engine attachment 11 at the front, and a rear engine attachment 12 at the rear. The front engine attachment 11 is secured between the pylon 2 and the fan casing 6a (or a structural element extending from the fan casing) while the rear engine attachment 12 is secured between the pylon 2 and the engine casing 7a.

As is known, an engine attachment 11, 12 comprises fittings which serve for securing the pylon 2 to the turbomachine 4. The fittings are chosen from among two-point and three-point fittings. Two-point fittings comprise two main links, and three-point fittings comprise two main links and an additional link, referred to as a safety link, which backs up a main link and is not operational under nominal operation of the engine attachment.

A main or safety link is in the form of an assembly comprising a clevis secured to the pylon 2 or the turbomachine 4, and a swivel bearing secured to the fitting 21-23 via an articulation pin that passes through the clevis and engages in the swivel bearing.

A main link has a clearance-free fit such that the main load paths of the engine attachment pass through the main links of the fittings 21-23. By contrast, a safety link has a clearance fit so as to form a secondary load path which is used only in the event of failure of the main path, that is to say in the event of the main link breaking.

Figure 2:
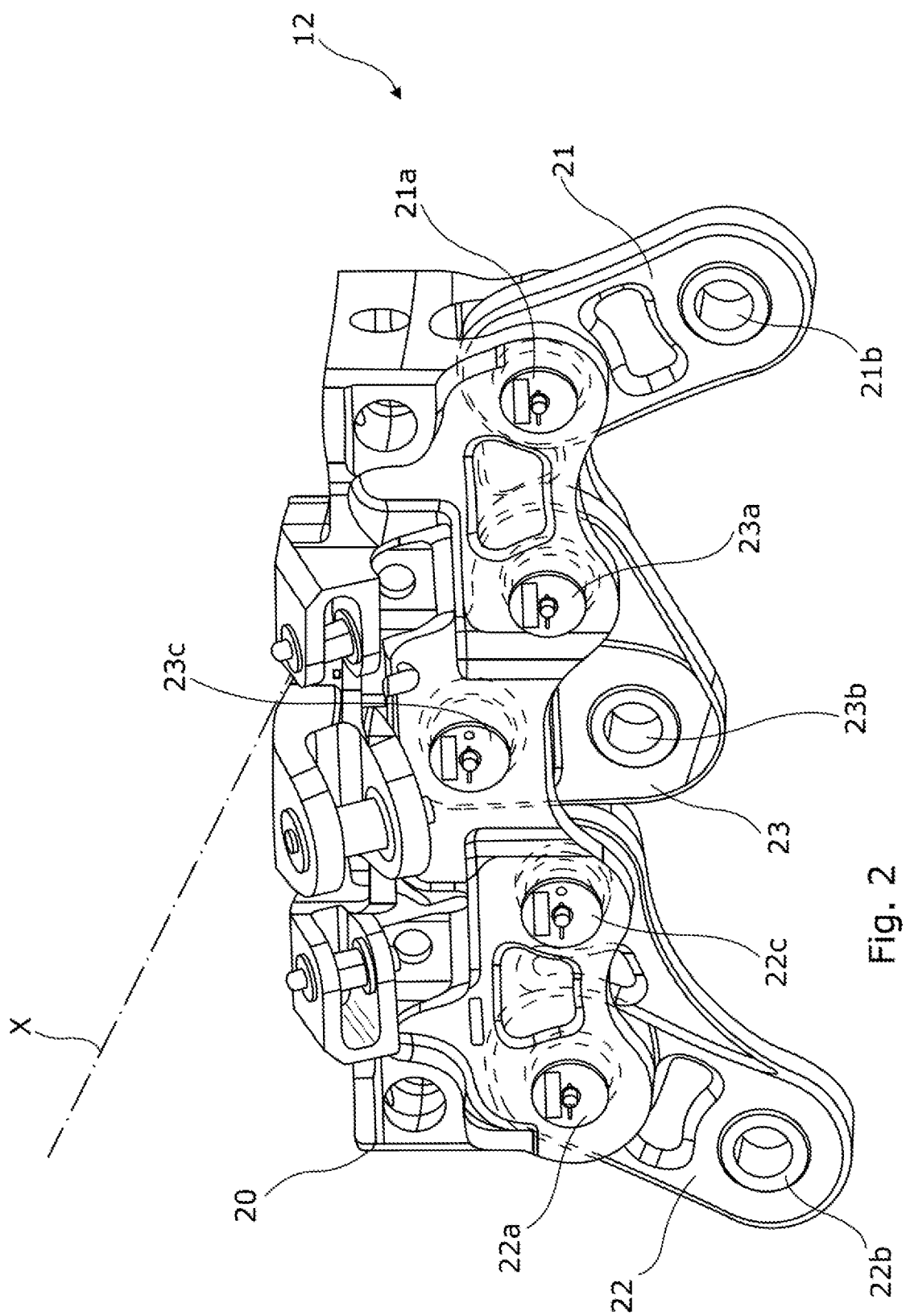
FIG. 2 is a perspective view of an engine attachment of an aircraft propulsion assembly according to the invention.

In the example shown in FIG. 2, the rear engine attachment 12 comprises:
- a first lateral fitting 21, of the two-point type, secured by a main link 21a to the beam 20 and intended to be secured by a main link to the engine casing 7a;
- a second lateral fitting 22, of the three-point type, secured by a main link 22a to the beam 20 and secured by a main link 22b to the engine casing 7a. The second lateral fitting 22 further comprises an additional safety link 22c to the beam 20.
- a central fitting 23, of the three-point type, secured by a main link 23a to the beam 20 and secured by a main link 23b to the engine casing 7a. The central fitting 23 further comprises a safety link 23c to the beam 20.

Figure 3:
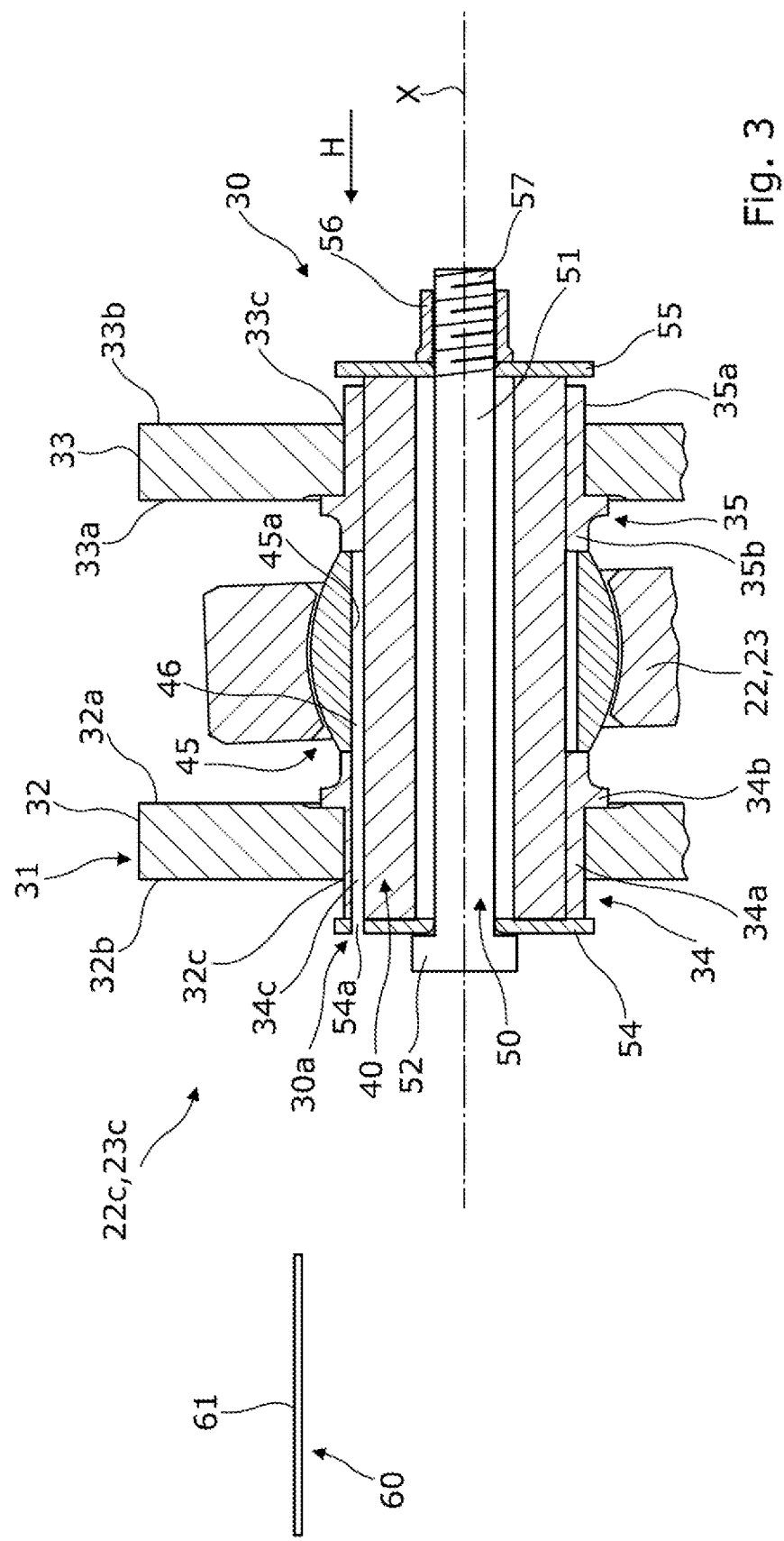
FIG. 3 is a view in section of the safety link of the engine attachment of FIG. 2, in the non-operational position.
Figure 4:
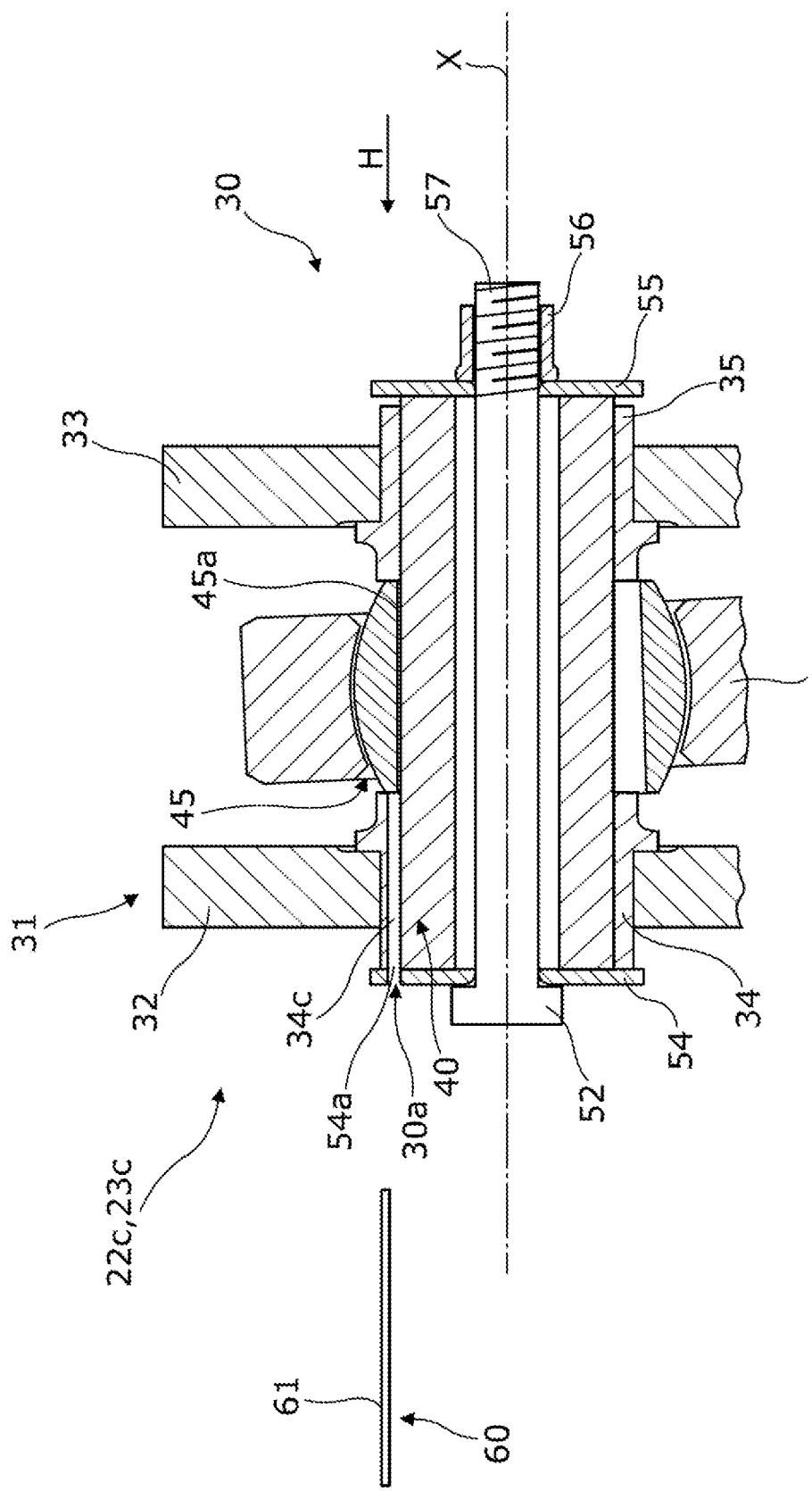
FIG. 4 is a view similar to FIG. 3 of the safety link shown in its operational position.

With reference to FIGS. 3 and 4, a safety link 22c, 23c is in the form of an assembly 30 comprising a clevis 31 created in the beam 20, a swivel bearing 45 arranged on the fitting 22, 23, and an articulation pin 40, formed by a hollow cylindrical body, which passes through the clevis 31 and engages in the swivel bearing 45. The pins and bores have a clearance fit such that the safety link is not loaded during nominal operation of the engine attachment.

According to the invention, the assembly 30 of the safety link 22c, 23c comprises at least one passage 30a into which it is possible to slide a tool 60 for checking the presence of a clearance in an upper portion H of the assembly 30.

The clevis 31 comprises two arms 32, 33, each comprising an inner face 32a, 33a and an outer face 32b, 33b, wherein the inner faces 32a, 33a of the two arms 32, 33 face each other. Each arm 32, 33 comprises a bore 32c, 33c into which is inserted a sleeve 34, 35 that extends essentially along the longitudinal axis X. The sleeves 34, 35 inserted into the bores 32c, 33c of the two arms 32, 33 have generally identical dimensions and are moreover coaxial and aligned.

Each sleeve 34, 35 comprises a smooth cylindrical stem 34a, 35a, of which an inner surface bears against the articulation pin 40 and an outer surface bears against the bore 32c, 33c of the arm 32, 33. The outer surface of the stem 34a, 35a is extended by an outer shoulder 34b, 35b which bears against the inner face 32a, 33a of the arm through which the sleeve 34, 35 is inserted, so as to form a stop.

The swivel bearing 45 comprises a bore 45a through which the articulation pin 40 is inserted. The diameter of the bore 45a is greater than the outer diameter of the articulation pin 40 so as to establish a clearance 46 between the swivel bearing 45 and the pin 40. In a scenario of nominal operation (as in FIG. 3) of the engine attachment 12, the safety link 22c-23c is not operational: there is no contact between the swivel bearing 45 and the articulation pin 40 of the safety link since all of the weight of the engine is reacted by the main link point 22a, 23a of the fitting 22, 23. By contrast (as in FIG. 4), in the event of failure of the main load path, the safety link 22c-23c is operational since the weight of the engine 7 is no longer reacted by the main link 22a, 23a and the three-point fitting 22, 23 will then move due to the weight of the engine 7, eliminating the clearance 46, at the upper portion H of the assembly 30, between the swivel bearing 45 and the articulation pin 40. The upper portion H of the assembly 30 is defined as the uppermost portion of the assembly 30 (generally at 12 o'clock) when the aircraft is on the ground.

The absence of a clearance is indicative of a failure of the main link 22a, 23a (that is to say, a failure of the main load path).

The swivel bearing 45 is arranged between the two sleeves 34, 35 and, for each sleeve, prevents movement of the sleeve 34, 35 in one direction of the longitudinal axis X, while the outer shoulder 34b, 35b of the sleeve prevents movement of the latter in the other direction.

The assembly 30 further comprises, in order to immobilize the articulation pin 40 in translation in the longitudinal direction X, a bolt 50 which is inserted into the articulation pin 40 and of which the shank 51 extends over a length greater than that of the articulation pin, and a pair of locking washers 54, 55 engaged on the bolt 50, with a first washer 54 positioned between the head 52 of the bolt and the articulation pin 40, and a second washer 55 positioned between the articulation pin 40 and an immobilizing element 56 secured to the free end of the shank 51 of the bolt. A washer 54, 55 has, as appropriate, an inner diameter that is smaller than the outer diameter of the head 52 of the bolt or of the immobilizing element 56, and an outer diameter that is greater than the outer diameter of the articulation pin 40.

The immobilizing element 56 is, for example, a nut screwed onto a threaded portion 57 of the bolt.

The passage 30a comprises, for a washer 54 and a sleeve 34 both located on a given side of the clevis 31, an opening 54a arranged on the washer 54 and a groove 34c extending over the entire height (that is to say the distance along the axis of revolution) of the sleeve 34.

The opening 54a of the washer 54 and the groove 34c of the sleeve 34 are in alignment, and are positioned at the upper portion H of the assembly 30 such that it is possible to slide the checking tool 60 through the opening and through the groove in order to check for the presence of a clearance 46 between the articulation pin 40 and the swivel bearing 45 at the upper portion H of the assembly 30.

The checking tool 60 is, for example, a thin rod 61 whose dimensions allow it to be inserted into the passage 30a. The thin rod 61 is long enough that, when the rod is inserted into the assembly 30 through the opening 54a and the groove 34c, it is possible to check that the articulation pin 40 is not in contact with the swivel bearing 45.

Figure 5:
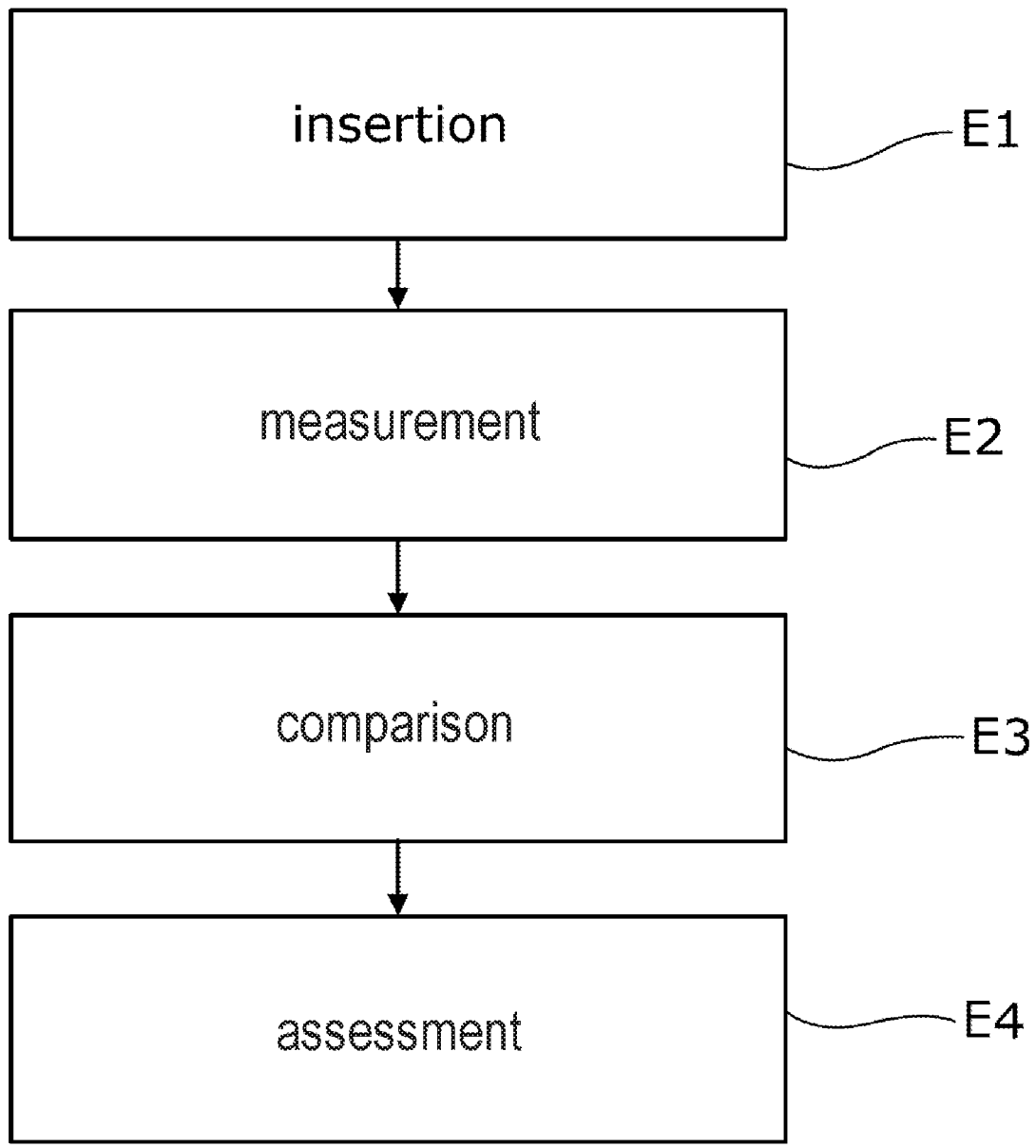
FIG. 5 is a schematic view of the steps of a method for checking the integrity of an engine attachment of the propulsive assembly according to the invention.

There follows a description, with reference to FIG. 5, of a method for checking the integrity of the engine attachment 12, as implemented by an operator. The method comprises a first step E1 of inserting the checking tool 60 through the passage 30a of the assembly 30 of the safety link 22c, 23c.

Then, in a second, measuring step E2, the operator measures the inserted length of the checking tool 60. In a third, comparison step E3, the operator compares the measured length with a predetermined length, and thus assesses, in an assessment step E4, the engine attachment 12 as being defective if the measured length is less than the predetermined length, or conversely assesses the engine attachment 12 as being intact if the measured length is equal to or greater than the predetermined length.

It is to be noted that, in this case, the washer 54 is free to rotate about the X axis in order that, once the check is finished, the operator can rotate the washer so that the full portion of the groove of the sleeve 34 is covered, thus preventing ingress of foreign bodies into the mechanism.

Figure 7:
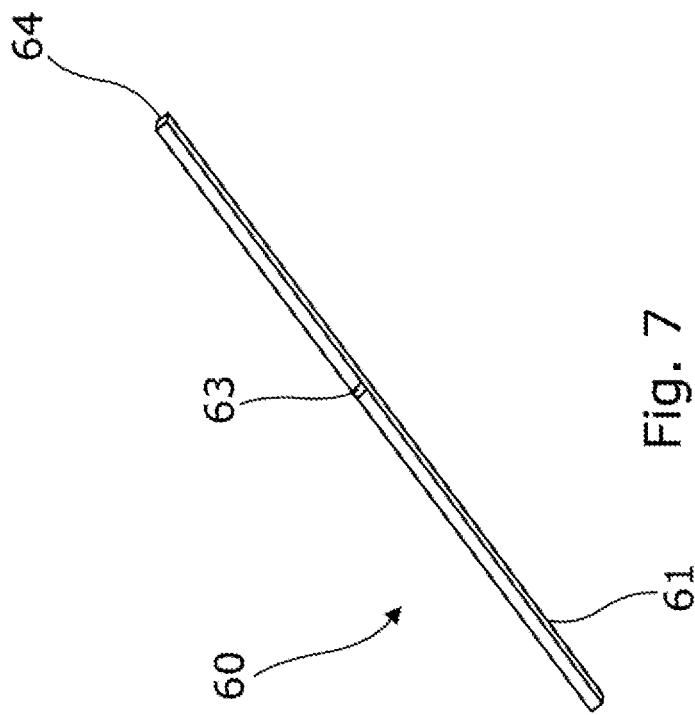
FIG. 7 is a view similar to FIG. 6, showing a checking tool according to another embodiment, intended to be inserted into a passage created in the safety link of FIG. 3 for implementing the method represented in FIG. 5.
Figure 6:
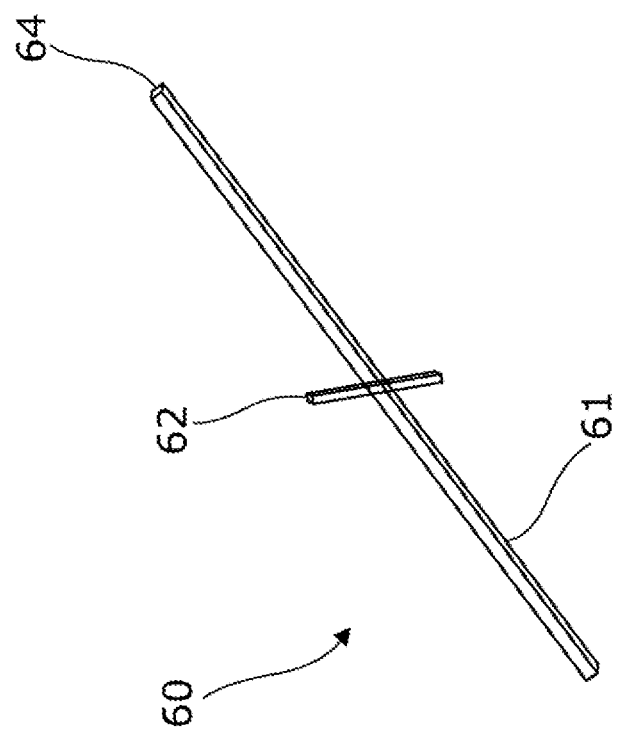
FIG. 6 is a perspective view of a checking tool intended to be inserted into a passage created in the safety link of FIG. 3.

With reference to FIGS. 6 and 7, the checking tool 60 preferably comprises a stop 62 (FIG. 6) or a mark 63 (FIG. 7: the mark is, for example, engraved) arranged on the thin rod 61 in order to define the predetermined length, that is to say, the distance from the free end 64 of the thin rod 61 that can be inserted entirely via the passage 30a through the assembly 30 when a clearance 46 is present between the articulation pin 40 and the swivel bearing 45. A checking tool 60 of this kind speeds up the comparison step E3. The step E4 of assessing the integrity of the main load path is modified in the sense that:
  if the operator is able to bring the stop 62 into contact with the washer 54, or is able to bring the mark 63 to the washer 54, this means that there is a clearance 46 between the articulation pin 40 and the swivel bearing 45, and the operator can deduce therefrom that the engine attachment 12 is intact; by contrast
  if the operator is not able to bring the stop 62 into contact with the washer 54, or is not able to bring the mark 63 to the washer 54, there is no clearance 46 between the articulation pin and the swivel bearing at the upper portion H of the assembly 30, and the operator can deduce therefrom that the engine attachment 12 is defective since the secondary load path has been used. The operator will have to carry out a check and repair of the engine attachment 12.

The invention allows an operator to quickly check the presence or absence of a clearance 46 between the swivel bearing 45 and the articulation pin 40 of a safety link 22c, 23c, and thus to check if the main load path is intact. Indeed, it is not necessary for the operator to disassemble elements of the engine attachment 12 in order to carry out this check.

Figure 8:
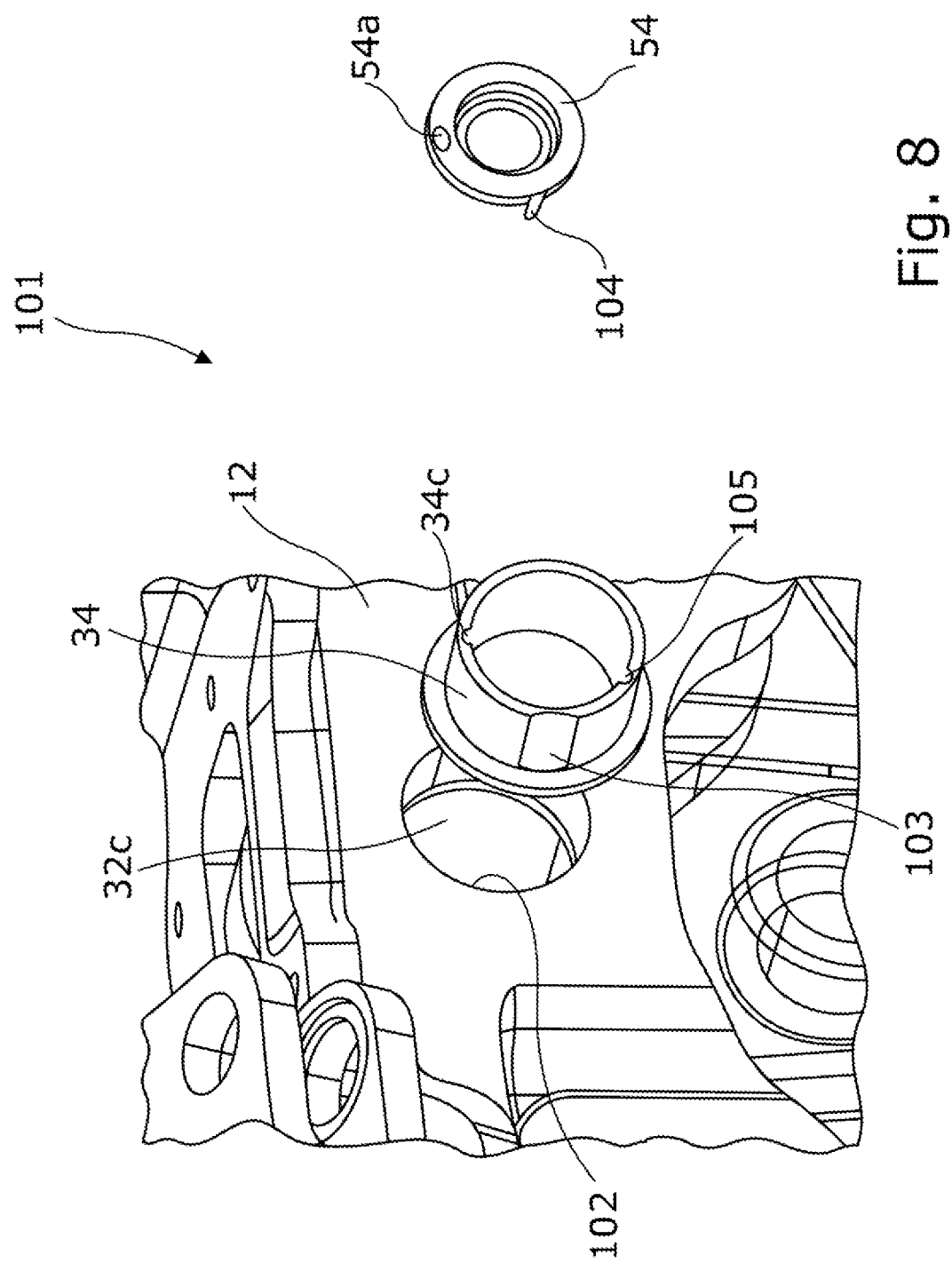
FIG. 8 is an exploded perspective view of elements of the safety link shown in FIG. 3, according to one variant of the invention.

With reference to FIG. 8, and in one variant of the invention, the assembly comprises means 101 for orienting the sleeve 34 with respect to the clevis 31, and for orienting the washer 54 with respect to the sleeve 34. These orientation means 101 permit rapid positioning, during assembly, of the sleeve 34 with the groove 34c in the upper portion H of the assembly 30, and make it possible to position the washer 54 with respect to the sleeve 34 such that the opening 54a coincides with the groove 34c.

To that end, the orientation means 101 comprise:
  a counter form 102 arranged in the bore 32c of the arm 32 and a flat 103, the shape of which matches that of the counter form 102, created on the outer surface of the smooth stem 34a of the sleeve 34. The flat 103, the counter form 102 and the groove 34c are positioned such that the insertion of the sleeve 34 into the bore 32c, constrained by the position of the flat 103 cooperating with the counter form 102, fixes the position of the groove 34c in the upper portion H of the assembly 30; and
  a poka-yoke (or centering pin) 104 extending from the washer 54 in the direction of the axis of revolution of the latter. For its part, the sleeve 34 comprises a notch 105. The notch 105 matches the dimensions of the poka-yoke 104 so as to accommodate at least part of the latter. The poka-yoke 104 and the notch 105 are positioned such that, when the poka-yoke 104 is received in the notch 105, the opening 54 is aligned with the groove 34c.

It is to be noted that, in this case, a removable closure means, of the silicone plug type, is inserted into the opening 54a of the washer 54 on completion of the check, so as to avoid ingress of foreign bodies into the mechanism.

Although described in relation to a safety link 22c, 23c between a fitting and the beam 20, the invention is applicable to any other safety link of an engine attachment, in particular, between a fitting 22, 23 and the turbomachine 4. The invention is described for a rear engine attachment 12, but is applicable to any other type of engine attachment comprising at least one fitting with a safety link.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. An aircraft propulsive assembly comprising:
a pylon, and
a turbomachine attached to the pylon by an engine attachment system comprising:
  two engine attachments, each secured to the pylon and to the turbomachine, each engine attachment comprising:

a fitting attached to the pylon by a first main link, and attached to the turbomachine by a second main link, the first and second main links having a clearance-free fit, the fitting being moreover secured to either the pylon or the turbomachine by an additional link, referred to as a safety link, the safety link being an assembly with a clearance such that the safety link has a non-operational status under nominal operation of the engine attachment, wherein the assembly of the safety link comprises at least one passage in communication with the clearance, the passage configured to receive, in operation, a tool for accessing the clearance externally from each attachment via the at least one passage and for checking a presence of the clearance to confirm the non-operational status of the safety link.

2. The aircraft propulsive assembly according to claim 1, wherein the safety link comprises:

a clevis arranged on the pylon or the turbomachine, a swivel bearing having a bore arranged on the fitting, and an articulation pin that passes through the clevis and engages in the bore of the swivel bearing, a diameter of the bore being greater than an outer diameter of the articulation pin so as to create a clearance between the swivel bearing and the articulation pin in an upper portion of the assembly.

3. The aircraft propulsive assembly according to claim 2, the clevis comprising two arms, each arm having a bore, the assembly comprising two sleeves, a separate one of the two sleeves being inserted into the bore of each of the arms, the articulation pin being mounted on the two sleeves, the assembly moreover comprising a bolt inserted into the articulation pin and a pair of locking washers engaged on the bolt with a first washer positioned between a head of the bolt and the articulation pin and a second washer positioned between the articulation pin and an immobilizing element secured to a free end of the shank, wherein the passage comprises an opening arranged on a washer and a groove extending over an entire height of one of the sleeves, the opening and the groove of the sleeve being aligned.

4. The aircraft propulsive assembly according to claim 3, wherein a counter form is arranged in the bore of the arm in which the sleeve provided with the groove is inserted, and a flat, the shape of which matches that of the counter form, is created on an outer surface of the sleeve.

5. The aircraft propulsive assembly according to claim 3, wherein the washer provided with the opening comprises a poka-yoke extending in a direction of an axis of revolution of the washer, the sleeve having the groove comprising a notch that matches dimensions of the poka-yoke so as to receive at least part of said poka-yoke.

6. A method for checking an integrity of an engine attachment of an aircraft propulsive assembly, the propulsive assembly comprising:

a pylon, and a turbomachine attached to the pylon by an engine attachment system comprising two engine attachments each secured to the pylon and to the turbomachine, each engine attachment comprising at least one fitting attached to the pylon by a first main link, and attached to the turbomachine by a second main link, each of the first and second main links having a clearance-free fit, the fitting being moreover secured to either the pylon or the turbomachine by an additional link, referred to as a safety link, the safety link being an assembly with a clearance such that the safety link has a non-operational status under nominal operation of the engine attachment, the assembly of the safety link comprising at least one passage configured to receive, in operation, a tool for checking a presence of the clearance in order to confirm the non-operational status of the safety link, wherein the method comprises the following successive steps:

inserting a checking tool into the passage arranged in an upper portion of the assembly;

measuring an inserted length of the checking tool;

comparing the inserted length measured in the measuring step to a predetermined length;

assessing the integrity of the engine attachment, the engine attachment being assessed as defective if the measured inserted length is less than the predetermined length, or conversely the engine attachment being assessed as intact when the measured inserted length is equal to or greater than the predetermined length.

\* \* \* \* \*